(12) United States Patent
Moreman

(10) Patent No.: US 8,699,352 B2
(45) Date of Patent: Apr. 15, 2014

(54) TIMER OPTIMIZATION TECHNIQUES FOR MULTICAST TO UNICAST CONVERSION OF INTERNET PROTOCOL VIDEO

(75) Inventor: Charles Moreman, Grayson, GA (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 13/168,045

(22) Filed: Jun. 24, 2011

(65) Prior Publication Data

US 2012/0327780 A1    Dec. 27, 2012

(51) Int. Cl.
*H04L 12/26*  (2006.01)
*H04L 12/56*  (2006.01)
*H04L 12/18*  (2006.01)
*H04L 12/54*  (2013.01)

(52) U.S. Cl.
CPC ............ *H04L 45/16* (2013.01); *H04L 12/1868* (2013.01); *H04L 12/56* (2013.01)
USPC ......................................................... 370/241

(58) Field of Classification Search
CPC ........................................................ H04L 45/16
USPC ................................. 370/241, 389; 725/115
See application file for complete search history.

(56) References Cited

U.S. PATENT DOCUMENTS

| | | | |
|---|---|---|---|
| 8,115,773 B2 * | 2/2012 | Swift et al. ..................... 345/522 |
| 2003/0231629 A1 * | 12/2003 | Banerjee et al. .............. 370/390 |
| 2008/0287135 A1 * | 11/2008 | Saito et al. ..................... 455/445 |
| 2009/0293093 A1 * | 11/2009 | Igarashi ........................ 725/115 |
| 2010/0017673 A1 * | 1/2010 | Lu et al. ........................ 714/749 |

* cited by examiner

*Primary Examiner* — Wei Zhao
(74) *Attorney, Agent, or Firm* — Merchant & Gould

(57) ABSTRACT

Multicast to unicast conversion may be provided. First, a request for a data packet may be received at a conversion device. The conversion device may determine that the requested data packet has not yet been received using a multicast transmission protocol. Next, the conversion device may wait a time period to receive the data packet using the multicast transmission protocol. When the data packet has not been received within the time period, conversion device may then request the data packet using a unicast transmission protocol.

21 Claims, 3 Drawing Sheets

TIMER OPTIMIZATION TECHNIQUES FOR MULTICAST TO UNICAST CONVERSION OF INTERNET PROTOCOL VIDEO

BACKGROUND

Network efficiency and scalability of Internet Protocol (IP) Video delivery can benefit from multicast delivery of IP video packets to multiple receivers. However, multicast delivery of IP video, when compared to unicast delivery of IP video, may at times be problematic. These problems may include incompatibility with many IP video client devices and problems with multicast delivery over wireless networks.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

OVERVIEW

Figure 1:
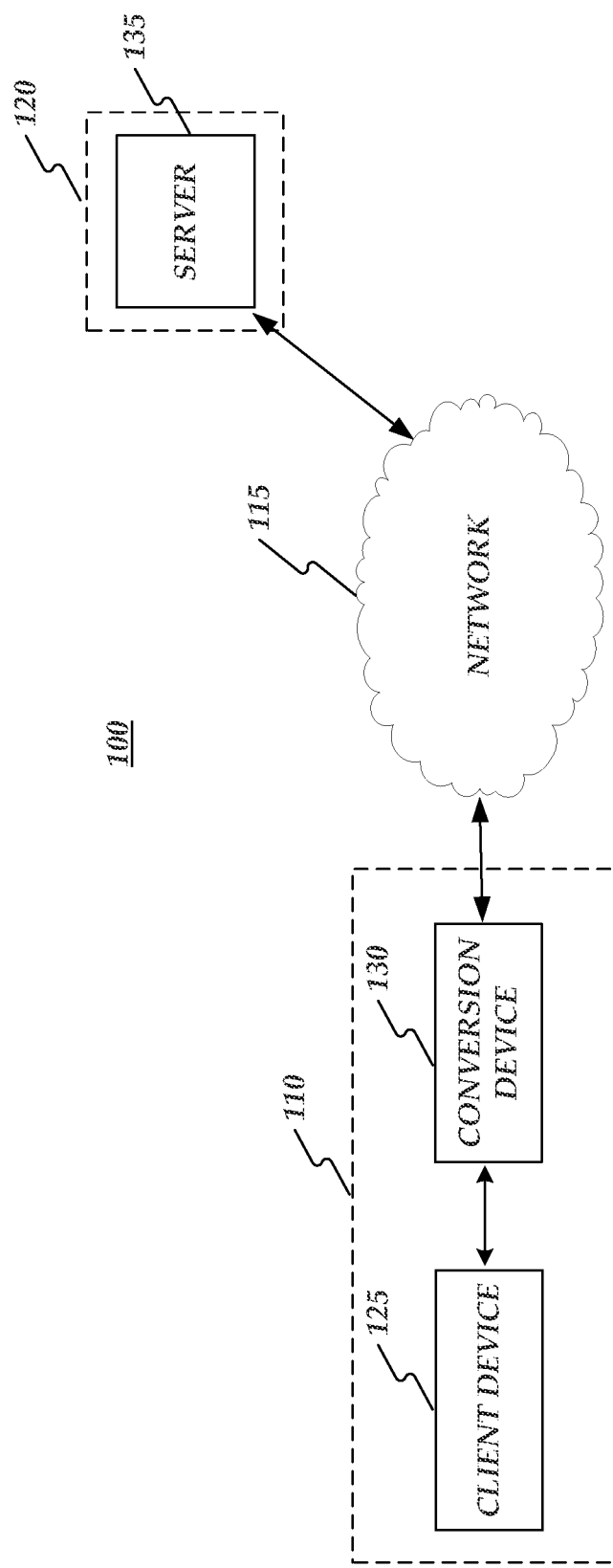
FIG. 1 is a block diagram of an operating environment including a conversion device.

Multicast to unicast conversion may be provided. First, a request for a data packet may be received at a conversion device. The conversion device may determine that the requested data packet has not yet been received using a multicast transmission protocol. Next, the conversion device may wait a time period to receive the data packet using the multicast transmission protocol. When the data packet has not been received within the time period, conversion device may then request the data packet using a unicast transmission protocol.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A content delivery system (CDS) may often need to transmit video content to multiple client devices simultaneously. Rather than providing the video content transmission to each client device individually (e.g., unicast transmission), it may be more efficient to broadcast the video content to all of the client devices in a single video transmission (e.g., multicast transmission). However, not all client devices are configured to receive a multicast transmission. As a result, client devices that are not compatible with multicast transmissions may need to have the multicast transmissions converted to a compatible transmission type, such as a unicast transmission, before being able to receive the video content. Accordingly, customer premise equipment (CPE) operatively tied to the client devices may comprise a gateway, or conversion device, that may be employed to convert multicast transmissions received from the CDS and provide unicast transmissions to requesting client devices. Network devices that can convert IP video streams from multicast to unicast transmission streams in the home can optimize content delivery to best suit their networks, but optimal conversion can be problematic.

Consistent with embodiments of the disclosure, multicast to unicast conversion optimization techniques are provided. A client device that would like to receive IP video transmissions from the CDS may make a request to the conversion device to receive the content using unicast transmission method. The conversion device may determine that the content can be received via multicast and transparently convert the multicast stream to a unicast stream so that it can be received by the client device. Specifically, the client may request to receive the unicast transmission in small IP video packets comprising the video content. These video packets may be requested and received by the client device in advance of their playback time at the client device.

The client device may then maintain these requested video packets in a buffer to smooth out varying packet arrival latency and/or detect missing packets as quickly as possible. This, in turn, may help the client device provide an increased quality of video playback with minimal play out stalls.

Often times, however, the conversion device may itself not have yet received the IP video packet requested by the client device. This may be a result of the client device attempting to ensure a stable video playback quality by buffering video packets well in advance of their arrival at the conversion device. Since the conversion device may not yet have the video packet requested by the client device, it must analyze how it is to fulfill the client request.

Consistent with embodiments of the disclosure, the conversion device may delay responding to the client request until it receives the requested video packet from the CDS in its regular course of multicast transmission of the video content. Once the conversion device receives the requested video packet from the multicast transmission, it may provide the packet to the client device at a unicast transmission. This, however, may result in undesirable video playback delays at the client device.

Still consistent with embodiments of the disclosure, the conversion device may, instead of waiting for the requested packet to arrive in its regular course of multicast transmission, make a separate unicast request to the CDS for the requested video packet. The CDS may respond to the conversion device with the requested packet and, in turn, the conversion device may provide the requested packet to the client device. However, because the CDS will need to provide a specific data packet for a specific client device, it may need to communicate with the conversion device in a unicast transmission protocol in addition to its already streaming multicast transmission. As a result, the bandwidth required by the CDS to satisfy specific packet requests may overly burden servers within the CDS when multiple client devices attempt to request packets that have not yet been received at their corresponding conversion device.

Accordingly, embodiments of the present disclosure may provide an optimized multicast to unicast conversion employing timer optimization techniques. For example, the conversion device may determine that a request for a video packet can be satisfied by waiting for the requested packet to be received from the multicast transmission flow or that the conversion device should send a unicast transmission request to the CDS for the video packet. Though various parts of the present disclosure refer to multicast and unicast transmissions of video content, it should be noted that embodiments of the disclosure may be employed in optimizing transmissions of various content types at various transmission protocols.

FIG. 1 is a block diagram of an operating environment 100. As shown in FIG. 1, environment 100 may include CPE devices 110, a network 115, and a CDS 120. CDS 120 may comprise a server 135 capable of providing both a unicast and multicast transmission of content, such as IP video, to CPE devices 110. In various embodiments of the disclosure, server 135 may comprise a separate serving device for each type of transmission. Alternatively, server may comprise a single device capable of providing both unicast and multicast content transmission.

The unicast and multicast transmission may be communicated over network 115. Network 115 may be compatible with various communication protocols used to communicate unicast and multicast broadcasts. For example, server 135 may communicate with CPE devices 110 over network 115 using a using datagram protocol (UDP) typically used to communicate multicast transmissions. For various other transmissions, such as unicast transmissions, server 135 may communicate with CPE devices 110 over network 115 using Transmission Control Protocol/Internet Protocol (TCP/IP). CDS 120 may provide both multicast and unicast transmissions of the same content.

Consistent with embodiments of the disclosure, CPE devices 110 may comprise a client device 125 configured to request, receive, buffer, playback, and store, for example, content, which may be embodied in IP video packets or other data packets received either directly or indirectly from CDS 120. Client device 125 may be, but is not limited to, a set-top box, a personal computer, a mobile phone, or any other computing device capable of communicating with a conversion device 130 and CDS 120 over network 115. In various embodiments of the disclosure, client device 125 may only be configured to receive unicast transmissions of content. As such, in a multiple client network, the bandwidth necessary for server 135 to satisfy multiple requests for unicast content transmissions from multiple client devices may be too burdensome or may lead to congestion on network 115. Accordingly, to reduce the burden on server 135 or congestion on network 115, conversion device 130 may be provided within the set of CPE devices 110 for receiving content at multicast transmissions from CDS 120 and providing unicast transmission of the content to the client device 125 by converting the multicast transmissions to unicast transmissions. In this way, CDS 120 may continue providing content at a multicast transmission while client device 125 receives the content at a unicast transmission from conversion device 130.

Figure 2:
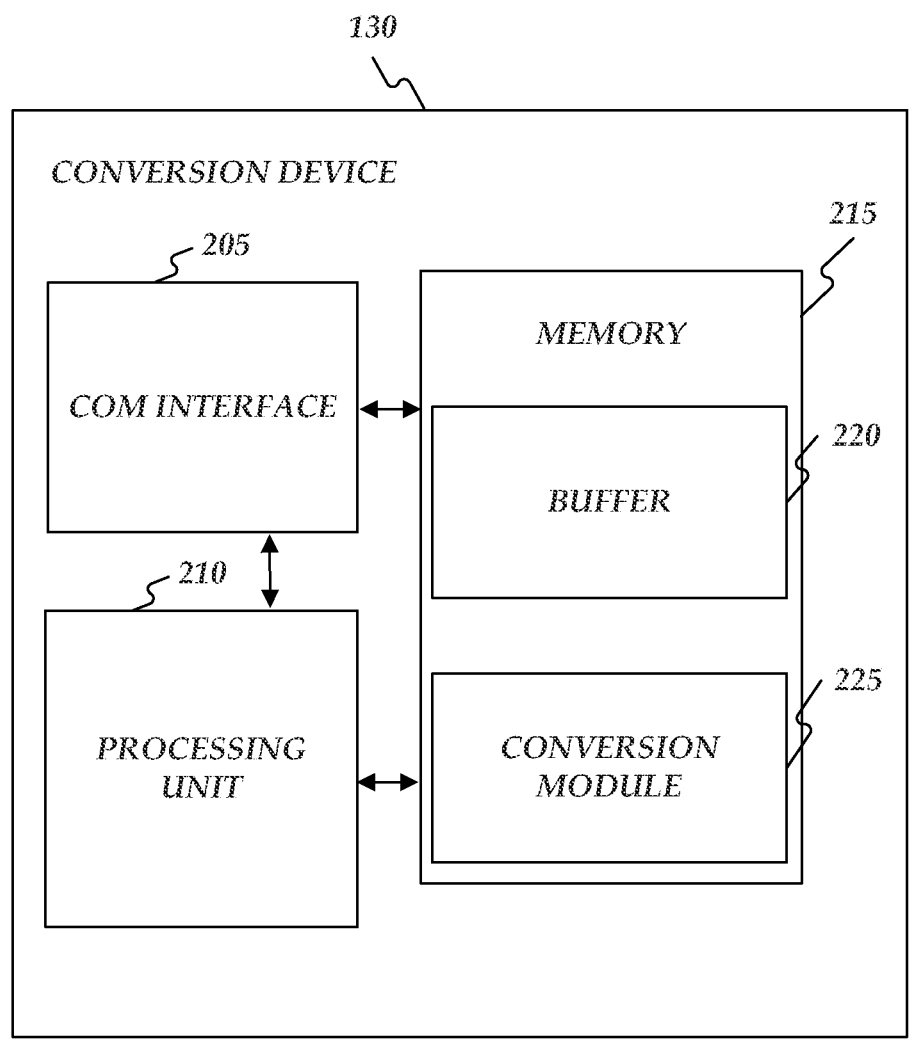
FIG. 2 is a block diagram of the conversion device.

FIG. 2 is a block diagram of conversion device 130. Consistent with embodiments of the disclosure, CPE devices 110 may comprise conversion device 130 in order to provide multicast to unicast conversion when client device 125 is not capable of receiving multicast broadcasts provided by CDS 120. Conversion device 130 may serve as a gateway node between client device 125 and server 135, allowing for effective cross-protocol communication between client device 125 and CDS 120. As such, conversion device 130 may comprise a communications interface 205 configured to communicate i) over network 115 with CDS 120, and ii) with client device 125 within the set of CPE devices 110.

Consistent with embodiments of the disclosure, conversion module 225 may convert IP video packets associated with received content from CDS 120 to a transmission protocol compatible with client device 125. With conversion module 225, conversion device 130 may receive content transmitted from CDS 120 at a first transmission type (e.g., multicast transmission) and provide the received content to client device 125 at a converted second transmission type (e.g., unicast transmission).

Furthermore, conversion device 130 may also store content received from CDS 120. Conversion device 130 may comprise a processing unit 210 operatively associated with a memory 215. Memory 215 may comprise a cache 220 for storing content packets, such as IP video packets, received from the CDS 120 at, for example, the multicast or unicast transmission protocol. In this way, conversion device 130 may store the IP packets associated with the received content from CDS 120 and provide, upon request from client device 125, the IP packets to client device 125 at a unicast transmission protocol. Thus, conversion device 130 may satisfy requests for content from client device 125 by i) receiving IP packets associated with the content at a multicast transmission protocol, ii) storing the IP packets in cache 220, iii) receiving a request for the IP packets from client device 125, iv) converting the IP packets for unicast protocol transmission by conversion module 225, and v) sending the IP packets to client device 125 at the unicast transmission protocol.

Consistent with embodiments of the disclosure, conversion deice 130 may make requests to CDS 120 for specific IP packets it has not yet received with from multicast transmission of the video content. These requests may be made employing the unicast transmission protocol while still maintaining the multicast transmission from CDS 120. In response, CDS 120 may employ server 135 to respond to conversion device 130 with the requested packet using a unicast transmission protocol.

Figure 3:
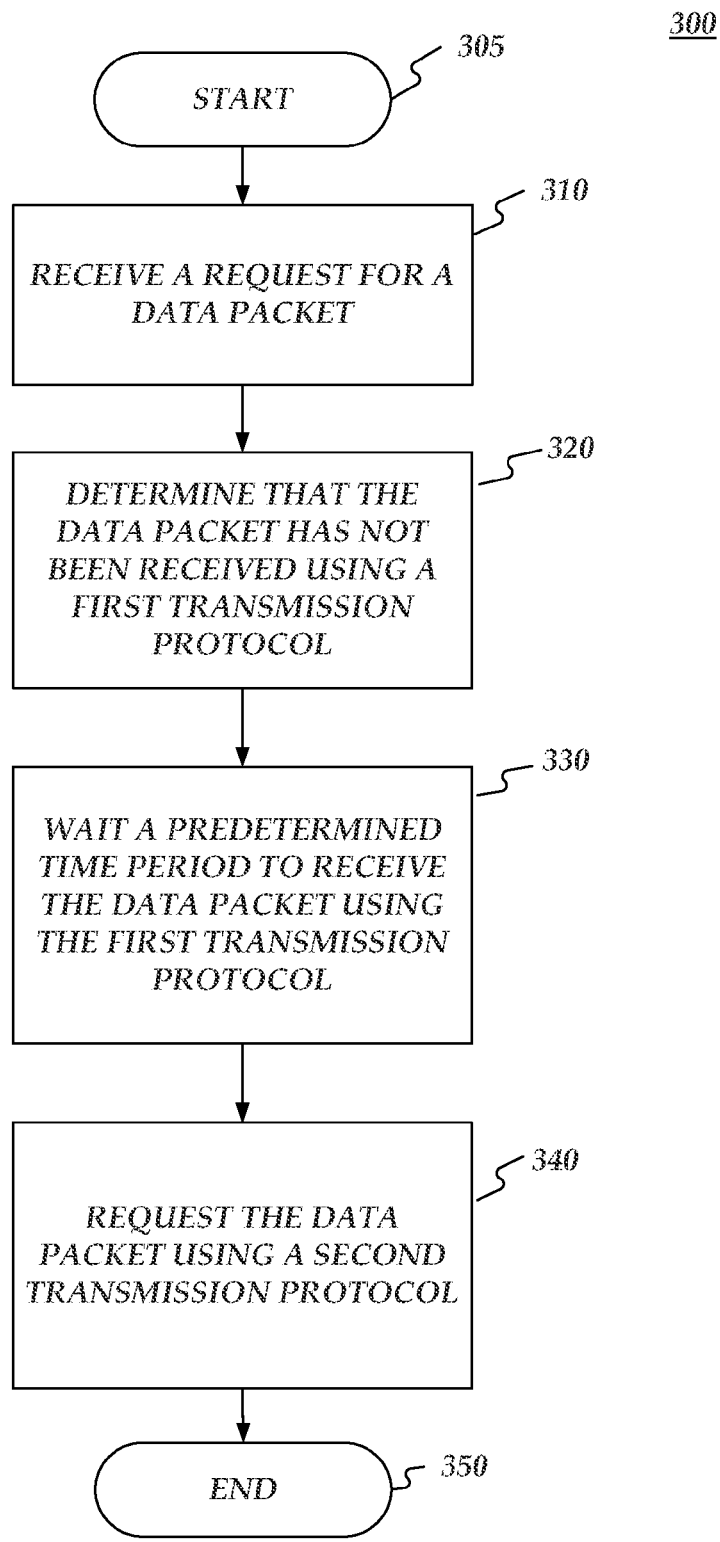
FIG. 3 is a flow chart of a method for providing conversion.

FIG. 3 is a flow chart setting forth the general stages involved in a method 300 consistent with an embodiment of the disclosure for providing content conversion. Method 300 may be implemented using conversion device 130 as described in more detail above with respect to FIGS. 1 and 2. Ways to implement the stages of method 300 will be described in greater detail below.

Method 300 may begin at starting block 305 and proceed to stage 310 where conversion device 130 may receive a request for a data packet from client device 125. The requested data packet may be associated with, for example, an IP video packet from a video transmission streamed from CDS 120. Client device 125 may have requested the data packet for placing the data packet in a buffer of client device 125. The buffer in client device 125 may be used to ensure that the video steam may be played back without, for example, latency.

From stage 310, where conversion device 130 receives the data packet request, method 300 may advance to stage 320 where conversion device 130 may determine that the requested data packet has not been received using a first transmission protocol. For example, client device 125 may be requesting the data packet in a unicast transmission protocol while the data packet may be provided to conversion device 130, from CDS 120, in a multicast transmission protocol. As the requested data packet may contain video content for a future time, CDS 120 may not have yet provided the requested packet to conversion device 130 and, consequently, conversion device 130 may not have the requested packet in its cache 220. As a result, conversion device 130 may not yet have the data packet requested by client device 125.

Once conversion device 130 determines that it does not have the requested data packet in stage 320, method 300 may continue to stage 330 where conversion device 130 may wait an optimal time period to receive the requested data packet through a first transmission protocol. For example, conversion device 130 may initialize a timer and wait for the requested data packet to arrive in the multicast transmission currently being streamed from CDS 120. Consistent with embodiments of the disclosure, conversion device 130 may hold off, or delay responding to, the request for the data packet for the duration of the timer. Some implementations of client device 125 may support receiving a message from conversion device 130 to instruct client device 125 to wait. In either way, conversion device 130 may be provided with an opportunity to receive the requested data packet via the multicast transmission without expending the additional resources it would cost to forward the request for the data packet to CDS 120 using a unicast transmission protocol.

In various embodiments, the predetermined time period may be, for example, five seconds. If the requested data packet is received from CDS 120 by conversion device 130 within the predetermined time period, conversion device 130 may respond to client device 120 with the requested data packet.

In order to determine an optimal time value for the time period that conversion device 130 should delay responding the request for the data packet, conversion device 130 may monitor a pattern of arriving unicast data packet requests from client device 125 and arriving multicast data packets from CDS 120. For example, conversion device 130 may measure a time offset between the arrival of a unicast data packet request and the subsequent arrival of the requested data packet in the multicast transmission stream. A moving average of this time offset measurement may be calculated over, for example, the last 100 packets in the same stream. Then, conversion device 130 may periodically adjust the value of the timer to equal, for example, approximately 120% of the average. In various embodiments of the disclosure, a variance in the arrival offset may be sampled and statistical analysis may be used to more precisely optimize the timer.

Still consistent with embodiments of the disclosure, conversion device 130 may understand the position of the multicast transmission stream relative to 'real time'. For example, in a live media transmission, conversion device 130 may monitor a pattern of arriving media packets in the multicast transmission received from CDS 120 by measuring the delay of the packets representing a live stream compared to the current 'real time' that either: i) the media within the data packets represents or ii) the actual transmission time of the data packets. Based on a statistical variation of the packet delay from the current 'real time', conversion device 130 may determine an optimal value for the timer.

For example, conversion device 130 may predict an expected latency of the data packets arriving from the multicast transmission stream and optimize the value for the timer based on this value. For example, conversion device 130 may monitor the timing of incoming data packets in the multicast transmission stream and determine that, in the last 5 minutes, 99.99% of the data packets arrive within 3.5 seconds of 'real time'. Using this information, when conversion device 130 receives a unicast request for a data packet, it is able to predict that it can satisfy 99.99% of the unicast requests for the multicast transmission stream by waiting 3.5 seconds after real time. In this scenario, the timer may be set to approximately 3.5 seconds.

In various embodiments of the disclosure, an upper bound to the duration of the timer may be set. In scenarios where the multicast transmission stream is itself experiencing delays, supplementing the delays with a timer may lead to more latency problems. Accordingly, the duration of the timer may be limited to remain within a provisional time window of the current 'real time'.

After conversion device 130 waits the predetermined time period in stage 330, method 300 may proceed to stage 340 where conversion device 130 may request the data packet from CDS 120. For example, if the timer has expired since the time the request for the data packet was received from client device 125, and the requested data packet has not yet arrived from CDS 120, conversion device 130 may make a unicast transmission request for the data packet to CDS 120. Once conversion device 130 receives the requested data packet, the conversion device 130 may provide the requested data packet to client device 125, and method 300 may then end at stage 350.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
  receiving a first transmission stream using a first transmission protocol;
  receiving a request for a data packet;
  determining that the data packet is not yet due for receipt in the first transmission stream;
  waiting a time period to receive the data packet in the first transmission stream, wherein the time period is determined by:
    monitoring an arrival pattern of a plurality of data packets in the first transmission stream corresponding to a plurality of data packet requests;
    determining a time offset between the receipt of the plurality of data packet requests and the receipt of the plurality of data packets in the first transmission stream,
    determining a moving average of the time offset for a predetermined number of the plurality of data packets, and
    determining the time period based on the moving average; and
  requesting, when the data packet has not been received within the time period, the data packet in a second transmission stream using a second transmission protocol.

2. The method of claim 1, wherein determining that the data packet has not been received using the first transmission protocol comprises determining that the data packet has not been received using a multicast transmission protocol.

3. The method of claim 1, wherein requesting, when the data packet has not been received within the time period, the data packet using the second transmission protocol comprises requesting the data packet using a unicast transmission protocol.

4. The method of claim 1, wherein receiving the first transmission stream using the first transmission protocol comprises receiving a multicast transmission of a live video stream.

5. The method of claim 1, further comprising:
  comparing the arrival time of the plurality of data packets to a real time of the live video stream corresponding to the plurality of data packets; and
  setting the time period based on the comparison.

6. The method of claim 1, further comprising setting an upper bound to the time period so as not to exceed a provisional time window.

7. The method of claim 1, further comprising caching the received data packet.

8. The method of claim 1, wherein receiving the first transmission stream using the first transmission protocol comprises receiving the first transmission stream from a content distribution system using a multicast transmission protocol.

9. The method of claim 1, wherein receiving the request for the data packet comprises receiving the request for the data packet from a client device using a unicast transmission protocol.

10. A computer readable device having a set of instructions which when executed performs a method executed by the set of instructions comprising:
  receiving a plurality of data packets in a first transmission stream using a first transmission protocol;
  receiving a request for a missing data packet,
  determining that the missing data packet has not yet been received with the plurality of data packets;
  waiting a time period to receive the missing data packet, wherein the time period for waiting is determined as:
    monitoring an arrival pattern of a plurality of missing data packets in the first transmission stream corresponding to a plurality of missing data packet requests;
    determining a time offset between the receipt of the plurality of missing data packet requests and the receipt of the plurality of missing data packets in the first transmission stream,
    determining a moving average of the time offset for a predetermined number of the plurality of missing data packets, and
    determining the time period based on the moving average; and
  requesting, when the missing data packet has not been received within the time period, the missing data packet in a second transmission using a second transmission protocol.

11. The computer readable device of claim 10, wherein receiving the plurality of data packets using the first transmission protocol comprises receiving the plurality of data packets using a multicast transmission protocol and wherein determining that the missing data packet has not been received using the first transmission protocol comprises determining that the missing data packet has not been received using the multicast transmission protocol.

12. The computer readable device of claim 10, wherein requesting, when the missing data packet has not been received within the time period, the missing data packet using the second transmission protocol comprises requesting the missing data packet using a unicast transmission protocol.

13. The computer readable device of claim 10, further comprising:
  comparing the arrival time of the received plurality of data packets to a real time corresponding to a creation of the received plurality of data packets; and
  setting the time period based on the comparison.

14. The computer readable device of claim 10, further comprising caching the received plurality of data packets.

15. The computer readable device of claim 10, wherein receiving the plurality of data packets using the first transmission protocol comprises receiving the plurality of data packets from a content distribution system using a multicast transmission protocol.

16. The computer readable device of claim 10, wherein receiving the request for the missing data packet comprises receiving the request for the missing data packet from a client device.

17. An apparatus comprising:
  a memory storage; and a processing unit coupled to the memory storage, the processing unit being configured to:

receive, from a server, a plurality of data packets in a first transmission stream at a multicast transmission protocol, cache the received plurality of data packets, receive, from a client device, a request for a missing data packet using a unicast transmission protocol, determine that the server has not yet sent the missing data packet, initialize a timer, wait for a duration of the timer to receive the missing data packet using the multicast transmission protocol, wherein the duration of the timer is determined as:

monitoring an arrival pattern of a plurality of missing data packets in the first transmission stream corresponding to a plurality of missing data packet requests;

determining a time offset between the receipt of the plurality of missing data packet requests and the receipt of the plurality of missing data packets in the first transmission stream, determining a moving average of the time offset for a predetermined number of the plurality of missing data packets, and determining the time period based on the moving average;

when the missing data packet has been received before an expiration of the timer, provide the missing data packet to the client device using the unicast transmission protocol, and when the missing data packet has not been received before the expiration of the timer:

request the missing data packet from the server using the unicast transmission protocol, receive the missing data packet from the server device in a second transmission using the unicast transmission protocol, wherein the second transmission stream occurs in parallel with the first transmission stream, and provide the missing data packet to the client device using the unicast transmission protocol.

18. The apparatus of claim 17, wherein the processing unit is further configured to:

compare the arrival time of the received of the plurality of data packets to a real time the plurality of data packets were sent, and set the timer based on the comparison.

19. The apparatus of claim 17, the plurality of data packets are associated with a live video stream.

20. The apparatus of claim 17, wherein the processing unit is further configured to cache the plurality of data packets.

21. The apparatus of claim 17, wherein the processor being configured to determine that the missing data packet has not been received comprises the processor being configured to determine that the missing data packed has not been cached.

* * * * *